May 16, 1961

R. C. KELNER ET AL 2,984,538

MAGNETIC STORAGE DRUM

Filed June 14, 1956

3 Sheets-Sheet 1

INVENTORS
ROBERT C. KELNER
SIDNEY P. WOODSUM
MURRAY E. HALE

BY Joseph Weingarten
ATTORNEY

INVENTORS
ROBERT C. KELNER
SIDNEY P. WOODSUM
MURRAY E. HALE

BY Joseph Weingarten
ATTORNEY

INVENTORS
ROBERT C. KELNER
SIDNEY P. WOODSUM
MURRAY E. HALE
BY Joseph Weingarten
ATTORNEY United States Patent Office 2,984,538

Patented May 16, 1961

2,984,538

MAGNETIC STORAGE DRUM

Robert C. Kelner, Concord, Sidney P. Woodsum, Groton, and Murray E. Hale, Haverhill, Mass., assignors to Laboratory for Electronics, Inc., Boston, Mass., a corporation of Delaware Filed June 14, 1956, Ser. No. 591,323

11 Claims. (Cl. 346—138)

The present invention relates in general to new and improved recording surfaces for magnetic data storage systems.

In general, the term "magnetic recording" relates to a process whereby data is stored in a magnetic medium, the data to be stored being transferred to the recording surface of the magnetic medium by means of a magnetic head. The term "readout" refers to the transfer of stored data from the recording surface. The data signals may be in analog or digital form having spectral components at audio frequencies or higher. Magnetic storage systems are peculiarly adapted to the recording/readout of data reduced to binary code notation. In such notation the data is in the form of binary digits or bits, one bit of data being represented by either a ZERO or a ONE pulse.

The number of bits of data which may be stored per linear inch of recording surface is limited, among other factors, by the spacing of the pole pieces of the magnetic head from the recording surface of the magnetic medium. The pole pieces are separated from each other by a short gap and terminate in a common pole face surface with the gap traversing the width thereof. Magnetic flux lines are set up between the pole pieces across the gap, the fringing flux lines encountering the recording surface and magnetizing a predetermined portion thereof. A short gap is necessary to yield high resolution when recording, as well as when reading data out of the system. The ratio between gap length and the wavelength of stored data along the recording medium should not exceed 1:4. For example, in high density recording of the order of 1000 bits per inch, the gap length should not exceed ¼ mil. The spacing of the pole face surface from the recording surface, as measured at the gap, is in large part responsible for the spreading of magnetic flux between these surfaces. When flux spreading occurs, the lines of flux which fringe between the two pole pieces, magnetize a greater than desired portion of the recording surface. In magnetic data storage systems where the wavelength of the recorded information measured along the recording medium is relatively short, for example, high density digital storage systems where the number of bits to be stored per linear inch may exceed one thousand, minimum flux spreading is required to concentrate the magnetic field, and bring about high resolution of data. Accordingly, minimum spacing between the surfaces, as measured at the gap, is necessary.

In magnetic data storage systems which employ a magnetic storage drum, the latter is generally mounted rotatably about its own axis, with the pole face surface of the pole pieces facing the drum surface. Rotation of the drum recording surface relative to the pole face surfaces defines a magnetic track on the recording surface due to the action of each pair of pole pieces. The recording surface on which the individual recording tracks are traced presents a number of specialized problems. In the first place, the mode of recording/readout must be considered. If the out-of-contact technique is used where the pole face surfaces do not contact the recording surface and minimum spacing is to be maintained between these surfaces, a relatively precise cylindrical recording surface is essential to achieve constant separation between the surfaces during rotation. If in-contact recording/readout is chosen, the same degree of surface precision is no longer necessary, but there remains the requirement for a smooth surface on which the heads will not "bounce" with attendant data loss. Furthermore, all pits and other forms of area blemishes and magnetic anomalies must be carefully avoided to retain the degree of reliability offered by the remainder of the recording system and associated circuitry.

Many substances and techniques for the preparation of cylindrical drum recording surfaces are known in the art. An elementary arrangement consists of a drum wrapped with cellulose base oxide coated magnetic recording tape. While this material is of proven reliability, continuous service in-contact recording at any appreciable speed is wholly out of the question.

The durability of oxide recording surfaces may be enhanced through the use of stretched cylindrical rubber bands over a cylindrical drum base, the rubber being generally impregnated with iron oxide and wax. While the data storage characteristics of a surface so prepared are quite acceptable, it lacks the precision necessary for out-of-contact recording. When such a surface is embodied in an in-contact system, it is not unusual for it to become scored and pitted in continuous use.

Continuous, smooth recording surfaces may also be prepared by using solid, cast magnetic recording drums and by plating or spraying a smooth cylindrical base metal drum with an appropriate magnetic material. Such drums are in fact in widespread use, but there exists the recognized limitation that the truly high-performance magnetic materials are incapable of being formed into cylindrical surfaces by any one of these techniques.

Accordingly, it is an object of this invention to provide new and improved magnetic recording surfaces in short wavelength magnetic data storage systems.

It is a further object of this invention to provide wire-wound magnetic recording surfaces for high density magnetic data storage apparatus.

It is another object of this invention to provide hard-surfaced magnetic recording surfaces which will withstand the abrasive wear of in-contact pole pieces.

It is still another object of this invention to provide recording surfaces comprising adjoining turns of Cunife wire, wound on a cylindrical drum support.

It is an additional object of this invention to provide techniques for winding and finishing the afore-mentioned wire-wound magnetic recording surfaces.

Briefly stated, the magnetic recording surfaces and techniques for making the same, which form the subject matter of this invention, comprise adjoining lengths of high-coercive force, drawn Cunife wire, at least one linear cross-sectional dimension of each of said lengths of wire being reduced in magnitude to form an even surface portion thereon, the individual surface portions so obtained adjoining each other to constitute a smooth, uniform high density recording surface. By way of example and not limitation, the recording surface so obtained may be used in a recording/readout arrangement which incorporates techniques known as hydrodynamic lubrication, more fully set forth in a co-pending application by Harrison W. Fuller and Carl W. Ledin, entitled "Magnetic Data Storage Techniques," Serial No. 564,229, filed February 8, 1956; another co-pending application by Harrison W. Fuller, Sidney P. Woodsum and William T. Darou, Jr., entitled "Magnetic Head Assemblies," Serial No. 566,261, filed February 17, 1956, now Patent No. 2,913,536; and a third co-pending application by Carl W. Ledin, William J. Gorman and George E. Engman, entitled "Magnetic Data Storage Apparatus," Serial No. 572,025, filed March 16, 1956.

In normal operation using hydrodynamic lubrication, each magnetic head effectively rides on a continuous, but exceedingly thin oil film. The close spacing thus established between the head and drum surfaces permits maximum utilization of the high-coercive force of Cunife wire to achieve correspondingly high data packing density on the recording track. During such normal operation, the oil film renders wear negligible, but during start-stop periods while the oil film is being established or terminated, wear is a factor to be considered. Cunife, which is exceedingly hard and abrasion resistant, is particularly well adapted to withstand the stress imposed during these relatively short time intervals.

Other novel features of this invention together with further objects and advantages thereof will become more apparent from the following detailed specification with reference to the accompanying drawings, in which.

Figure 1:
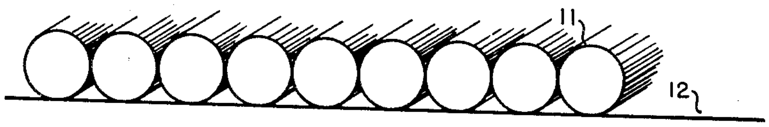
Fig. 1 is a cross-sectional view of a magnetic recording surface comprising adjoining lengths of round cross section wire.

With reference now to Fig. 1, a cross-sectional view of a magnetic surface is illustrated, comprising adjoining lengths 11 of high-coercive force wire of round cross section. Preferably, the material constituting the magnetic wire comprises an alloy of approximately 60% copper, 20% nickel and 20% iron, and has a high magnetic coercive force which to a large degree is obtained in the process of drawing the wire. The wire is commercially available under the name of Cunife. Since the desirable magnetic properties of Cunife are primarily a result of the drawing process, the available cross-sectional shapes are limited to those which may be economically drawn. The adjoining lengths of wire are disposed on a surface support 12 which is preferably flat in cross section. These wire lengths may or may not be interconnected to form continuous lengths of wire of uniform cross section.

In a preferred embodiment, the adjoining lengths of wire are interconnected and are wound on the surface of a cylindrical drum support. The wire winding on the drum constitutes at least one continuous helix of wire, the wire helix being uniform in cross section and having its axis coincident with the drum axis. It is important that adjoining turns of wire on the drum abut each other throughout the entire length of the turn in order to provide continuous contact therebetween. The turns of wire are wound with a lead along the length of the drum, such lead being equal to the width of the wire measured axially of the drum.

Figure 2:
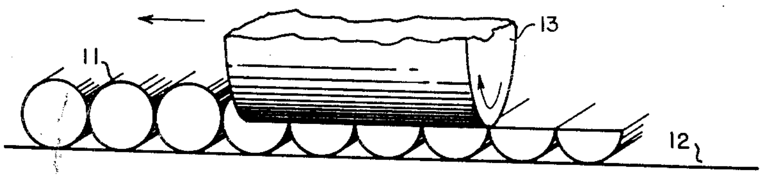
Fig. 2 illustrates the reduction in magnitude of a cross-sectional dimension of the adjoining lengths of wire of Fig. 1 to provide the finished magnetic recording surface.

With reference now to Fig. 2, a method is shown of reducing the cross-sectional dimension of adjoining turns of wire radially of the drum in order to provide a smooth, continuous magnetic recording surface thereon. Preferably, a high-speed grinding wheel 13 rotates in the direction shown while moving laterally in the direction of the straight arrow to cover all the wire turns. Simultaneously, the drum rotates about its own axis in a direction opposite to that of the grinding wheel in order to expose the entire wire turns to the action of the grinding wheel. This action removes one-half of each wire thickness, as shwn, to form a flat surface on each turn of wire. If the turns of wire are ground down to exactly half their thickness, the individual flat surfaces of successive turns will adjoin each other to present a smooth, continuous magnetic recording surface on the recording drum. The adjoining turns of wire abut each other along a line running the full extent of each turn. It will be noted that adjoining turns of wire on the drum need not belong to the same continuous helix of wire, but may belong to a plurality of wire helixes having periodically repeating turns along the length of the drum.

Figure 3:
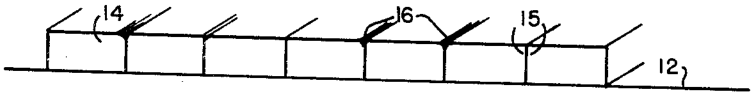
Fig. 3 is a cross-sectional view of a magnetic recording surface comprising adjoining lengths of rectangular cross section wire.

Fig. 3 illustrates a cross-sectional view of another embodiment of the invention. The turns 14 of high-coercive force, magnetic wire are rectangular in cross section and are wound on the supporting surface 12, as in the embodiment of Fig. 1. Successive turns of wire adjoin each other along coincident abutting surfaces 15 running the entire length of each turn. Any residual torque which tends to rotate a portion of the wire about its own axis, and hence bring about a saw-tooth effect on the recording surface, is restrained by the abutting surfaces 15 of adjoining turns. As shown in the drawing, wire turns 14 may contain irregularities 16, particularly at the wire edges, which must be removed so as not to impair the utility of the wire as a recording surface.

Figure 4:
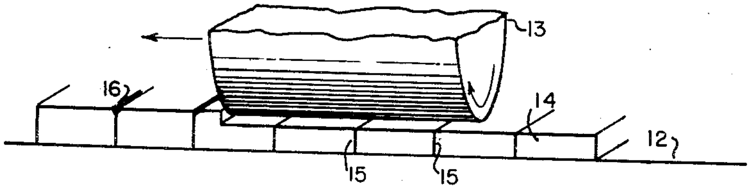
Fig. 4 illustrates the reduction in magnitude of a cross-sectional dimension of the adjoining lengths of wire shown in Fig. 3 to provide the finished magnetic recording surface.

Referring to Fig. 4, an operation similar to that shown in Fig. 2 is illustrated, for reducing the irregularities of wire turns 14. In contradistinction to the grinding operation illustrated in Fig. 2, grinding in the instant case may proceed to an arbitrary wire depth greater than the expected depth of irregularities 16, provided each turn of wire is ground down the same amount. Accordingly, the depth of grinding is not critical and no special precautions are necessary to maintain it so. The individual ground-off areas of successive turns of wire 14 are bounded by abutting surfaces 15 and adjoin each other to constitute a smooth, uniform, high density recording surface.

Figure 5:
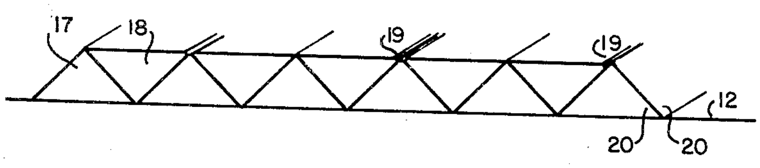
Fig. 5 is a cross-sectional view of a magnetic recording surface employing adjoining lengths of triangular cross section wire.

With reference now to Fig. 5, another embodiment of the invention is illustrated which employs two helixes of wire of triangular cross section whose turns alternate along the length of drum surface 12. It will be noted that the wire turns 17 of the first helix contact the drum surface 12 along the base of the triangular cross section, while the wire turns 18 of the other helix contact drum surface 12 at the apex of the triangular cross section. As in the embodiment of Fig. 3, successive turns of wire abut each other along coincident surfaces 20 which run the full extent of each turn. The abutting surfaces of adjoining turns restrain rotary motion of the wires due to any residual torques. The wires of turns 17 and 18 may also include irregularities 19 which must be removed.

Figure 6:
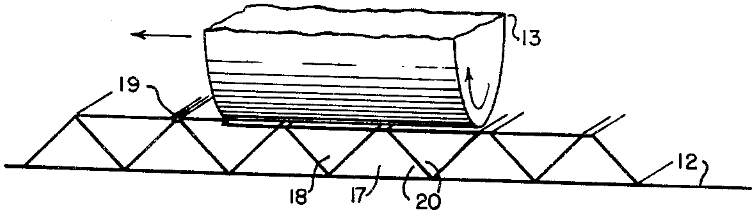
Fig. 6 illustrates the reduction in magnitude of a cross-sectional dimension of the adjoining lengths of wire shown in Fig. 5 to provide the finished magnetic recording surface.

Fig. 6 illustrates the removal of irregularities 19 by grinding. As in the embodiment of Fig. 4, the depth of grinding beyond the expected depth of wire irregularities 19 is not critical owing to the abutment of adjoining turns of wire along coincident surfaces. Grinding wheel 13, while reducing the cross-sectional dimension of all wire turns radially of the drum, removes metal from the base of the triangular cross section of turns 18 and from the apex of the triangular cross section of turns 17. The individual ground-off areas so determined on successive turns of wire, are bounded by abutting surfaces 20 and adjoin each other to constitute a smooth, uniform high density recording surface.

Figures 7, 9, 10:
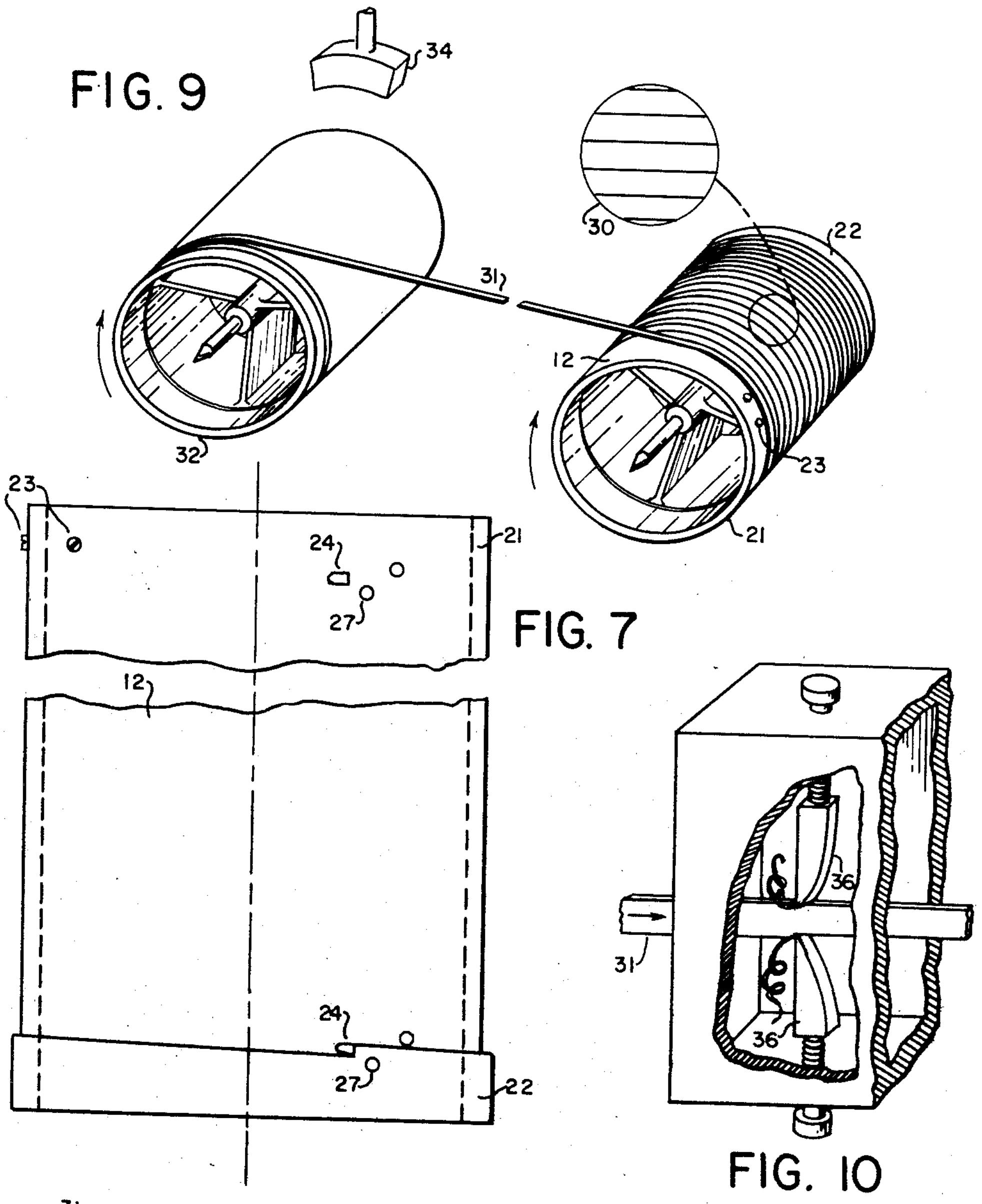
Fig. 7 is a view of the recording drum prior to winding.
Fig. 9 illustrates apparatus for winding the magnetic wire on the recording drum.
Fig. 10 illustrates the process of edging the magnetic wire preparatory to final winding.

With reference now to Fig. 7, the recording drum 21 is shown prior to winding its surface 12 with magnetic wire. A step shoulder 22 is located at the end of the drum to provide a firm support for the first turn of wire and keep it from sliding outwardly toward the end of the drum. Step 22 is approximately of the same height as the wire and has a lead angle or pitch which corresponds to the width of the wire along the length of the drum. Accordingly, upon winding the first complete turn, the wire, instead of closing upon itself, will form a helical turn along the length of the drum. Studs 23, which are of a height equal to that of step 22, are provided on the other end of the drum to keep the last turn of wire from sliding outwardly, thereby providing continuous abutment between adjoining turns of wire. Identical bores 24 which pierce the wall of the cylindrical recording drum at an angle, are adapted to receive the ends of the wire helix. Where a plurality of helixes is employed, bores are provided to receive the ends of each wire.

Figure 8:
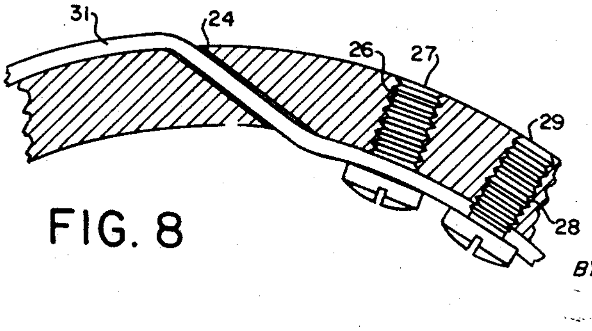
Fig. 8 is a detail view of the recording drum of Fig. 7.

Fig. 8 is a detail view of the drum of Fig. 7. It will be readily seen that the bores 24 which receive the wire pierce the cylindrical wall of drum 21 at an angle. Accordingly, magnetic wire 31 may enter the bore while avoiding any sharp turns which could cause the wire to lose its magnetic property. Threaded bores 26 and 28 are provided in the wall of the drum adjacent to bores 24. Threaded bolts 27 and 29 are adapted to mate with bores 26 and 28 respectively. The ends of magnetic wire 31 are clamped to the drum between the heads of bolts 27 and 29 to provide secure anchoring. Where a plurality of wire helixes is used, anchoring means must be provided to anchor both ends of each helix.

With reference now to Fig. 9, an arrangement is shown which is suitable for winding the magnetic wire on the recording drum as well as to prepare the wire prior to winding. Magnetic wire 31, shown to be of rectangular cross section by way of example but not limitation, is initially wound on feeder drum 32. One end of the wire is coiled around recording drum 21 and is anchored thereto as hereinabove explained. Both drums are rotatably arranged between lathe centers. The rotation of the recording drum 21 will wind the surface 12 of the latter with turns of magnetic wire 31 while unwinding feeder drum 32. Similarly, the rotation of feeder drum 32 in a counter-clockwise direction will wind the latter while unwinding the recording drum. Feeder drum 32 also has a brake 34 associated therewith to lock or retard any possible rotation of the drum, as desired.

With reference now to Fig. 10, an adjustable edging die 36 is shown which sharpens the edges of the magnetic wire 31 by removing metal from the sides of the wire when the latter is drawn through the die. When it is desired to use the edging die, the latter is interposed between the feeder drum and the recording drum. The wire is then passed back and forth through the die by winding and unwinding the respective drum as explained above. After each passage of the wire through the die, the die cutters are moved closer together by means of the adjusting screws provided, in order to facilitate the next cut.

Figure 11:
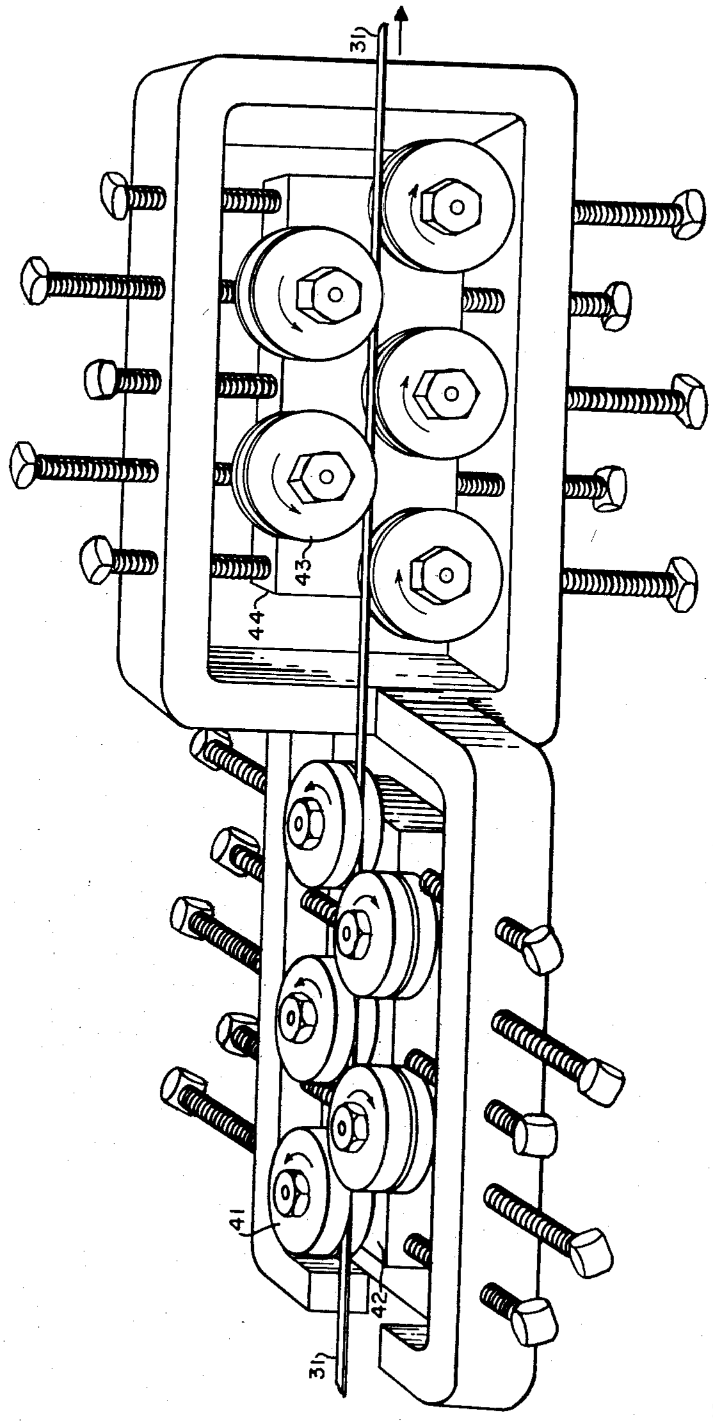
Fig. 11 illustrates the process of straightening the magnetic wire to remove any kinks prior to final winding on the recording drum.

Fig. 11 illustrates a die for straightening the mganetic wire in order to remove any kinks therein. Grooved wheels 41 are rotatably arranged on support 42 to receive the narrow edge of magnetic wire 31 when the latter passes through the apparatus. Similarly, grooved wheels 43 which are rotatably arranged on support 44, receive the broad edge of wire 31 when the latter passes through the straightening die. In operation, the wire is passed back and forth through the straightening die by winding and unwinding the drums as explained above.

After the wire has been edged and straightened preparatory to final winding, it is again wound on the feeder drum 32. Brake 34 is applied to the feeder drum in order to provide a drag. Accordingly, the rotary motion of recording drum 21 will wind magnetic wire 31 under tension. As explained in connection with Fig. 7, the lead angle of raised step 22 will initiate the winding of the turns of wire with a lead along the length of the drum. During the winding operation, force is applied to the wire in a direction opposite to the lead so that adjoining turns of wire will abut each other along their entire length, as shown in the magnified section 30 of Fig. 9. This force may be applied constantly during the winding operation or, alternatively, the winding operation may be interrupted and each turn of wire in question may be tapped in a direction opposite to that of said lead.

It will be understood that, where more than one wire is used to wind the drum, a plurality of feeder drums may be provided, each feeder drum simultaneously feeding its wire to the recording drum. In this case a plurality of wire helixes is wound on the recording drum, the turns of respective helixes periodically alternating with each other along the length of the drum.

After the recording drum has been wound, it is ready for grinding in accordance with the procedure set forth in connection with Figs. 2, 4 and 6, in order to provide a smooth, uniform, magnetic recording surface concentric with the drum.

Having thus described the invention, it will be apparent that numerous modifications and departures may now be made by those skilled in the art. Consequently, the invention herein disclosed is to be construed as limited only by the spirit and scope of the appended claims.

What is claimed is:

1. A plurality of successive lengths of high-coercive force magnetic wire of uniform cross-section disposed on a cylindrical drum support, adjacent ones of said lengths of wire having adjacent surfaces which abut each other to prevent rotation of said wires about their own axes, each length being substantially circular in shape in a plane perpendicular to the axis of said drum, successive lengths comprising component turns of wire coaxial with said drum, each length of wire having an external cylindrical surface with all portions of said external surfaces lying an equal distance from the drum axis, said external surfaces of said successive lengths adjoining each other to form a smooth, continuous high density recording surface concentric with said drum.

2. The invention defined in claim 1, wherein each of said turns of wire is pitched along the axis of said drum, said turns being interconnected to form at least one helix along the length of said drum, said helix comprising a continuous wire of uniform cross section having its first and last turn anchored to said drum.

3. The invention defined in claim 2 wherein said drum comprises a raised step at one end and the edge of said step is pitched along the length of said drum, the height of said step being equal to the cross-sectional dimension of said wire measured radially of said drum surface, the side of said step which faces the center of the drum abutting said first turn of wire, said drum surface being angularly pierced at both ends of the drum, to receive the ends of said continuous wire, said wire ends being anchored within said hollow drum, and means abutting said last turn of wire to retain the latter in adjoining relationship with its preceding turn.

4. The invention defined in claim 1 wherein said wire is polygonal in cross section.

5. The invention defined in claim 1 wherein the material constituting said wire comprises a drawn alloy of copper, nickel and iron.

6. The invention defined in claim 5 wherein said interconnected turns of wire comprise a single helix of rectangular cross section wire.

7. The invention defined in claim 1 wherein periodic ones of said turns of wire are interconnected to form a plurality of separate helixes of wire, the individual turns of respective helixes periodically alternating with each other along the length of said cylinder, the wire constituting each of said helixes being generally triangular in cross section, the triangular cross sections of successive turns alternately contacting said drum at the base and at the apex of said triangle.

8. Apparatus providing a smooth, continuous cylindrical recording surface having a cylindrical shape for cooperation with magnetic transducers comprising: a winding of high-coercive force magnetic wire arranged in the form of a continuous helix on a drum, adjacent convolutions of said winding being in mutually and continually forced abutting relationship, each convolution having an external surface which is cylindrical and coaxial with the axis of said helix, each of said external convolution surfaces being of equal diameter, and disposed in cocylindrical contacting relation with surfaces of adjacent convolutions, all portions of said external surfaces lying at equal distance from the axis of said drum, the aggregate of the external surfaces of each of said convolutions forming a smooth continuous recording surface having a cylindrical configuration, whereby each of said magnetic transducers in operation substantially in contact with said external cylindrical recording surface during relative motion therewith defines a closed circular track lying in a plane perpendicular to the axis of said helix with a smooth continuous transition between adjacent convolutions of said helix.

9. Apparatus in accordance with claim 8 wherein said wire has a semi-circular cross section, the diametric surface thereof corresponding to said external surface of each convolution, adjacent convolutions having said adjacent diametric surfaces in continuous, tangential contact.

10. Apparatus in accordance with claim 8 wherein periodic convolutions of said helix alternate with another helix along the length of said cylinder, the wire constituting each of said helixes being of generally triangular cross section, the triangular cross sections of successive turns alternately contacting said drum at the base and apex of said triangle.

11. Apparatus in accordance with claim 8 wherein said wire is polygonal in cross section.

References Cited in the file of this patent

UNITED STATES PATENTS

| | | |
|---|---|---|
| 822,222 | Poulsen | May 29, 1906 |
| 907,383 | Lieb | Dec. 22, 1908 |
| 2,431,739 | Eilenberger | Dec. 2, 1947 |
| 2,455,355 | Combs | Dec. 7, 1948 |
| 2,509,012 | Morrison | May 23, 1950 |
| 2,542,806 | Ford et al. | Feb. 20, 1951 |
| 2,590,313 | Hartmann | Mar. 25, 1952 |
| 2,740,686 | Kirchel | Apr. 3, 1956 |